US008191120B2

(12) United States Patent
Baum et al.

(10) Patent No.: US 8,191,120 B2
(45) Date of Patent: May 29, 2012

(54) POWERLESS ELECTRONIC STORAGE LOCK

(75) Inventors: Erez Baum, Rehovot (IL); Donald Rich, Haifa (IL); Itzhak Pomerantz, Kefar Saba (IL)

(73) Assignee: SanDisk IL Ltd., Kfar Saba (IL)

( * ) Notice: Subject to any disclaimer, the term of this patent is extended or adjusted under 35 U.S.C. 154(b) by 1045 days.

(21) Appl. No.: 11/471,565

(22) Filed: Jun. 21, 2006

(65) Prior Publication Data
US 2007/0162962 A1 Jul. 12, 2007

Related U.S. Application Data

(60) Provisional application No. 60/755,992, filed on Jan. 5, 2006.

(51) Int. Cl.
*H04L 29/06* (2006.01)
(52) U.S. Cl. .............. 726/5; 726/16; 726/17; 726/18; 726/19; 726/21; 726/34; 726/3; 711/163; 711/164; 711/100; 711/115; 206/307; 439/133; 235/435; 235/443; 235/441
(58) Field of Classification Search .............. 726/5, 9; 713/1, 172–174
See application file for complete search history.

(56) References Cited

U.S. PATENT DOCUMENTS

| 4,123,306 | A | * | 10/1978 | Landry ........................... 156/96 |
| 5,552,776 | A | * | 9/1996 | Wade et al. ................... 340/5.74 |
| 5,673,018 | A | * | 9/1997 | Lowe et al. ..................... 340/445 |
| 5,761,733 | A | * | 6/1998 | Miyauchi ........................ 711/164 |
| 6,745,330 | B1 | * | 6/2004 | Maillot ........................... 726/35 |
| 7,124,301 | B1 | * | 10/2006 | Uchida .......................... 713/189 |
| 7,224,656 | B2 | * | 5/2007 | Matsuda et al. ............. 369/53.22 |
| 7,380,713 | B2 | * | 6/2008 | McLean ......................... 235/443 |
| 7,390,201 | B1 | * | 6/2008 | Quinby et al. ................ 439/133 |
| 7,677,065 | B1 | * | 3/2010 | Miao .................................. 70/57 |
| 7,722,369 | B2 | * | 5/2010 | Bushby ......................... 439/134 |
| 7,823,198 | B2 | * | 10/2010 | Miller ............................. 726/19 |
| 7,873,768 | B2 | * | 1/2011 | Kale et al. ....................... 710/74 |
| 7,913,527 | B2 | * | 3/2011 | Chen ................................ 70/57 |
| 7,938,863 | B2 | * | 5/2011 | Skinner et al. ................. 726/35 |
| 8,037,269 | B2 | * | 10/2011 | Okamoto et al. ............. 711/163 |
| 2003/0005337 | A1 | * | 1/2003 | Poo et al. ....................... 713/202 |
| 2004/0017738 | A1 | * | 1/2004 | Uchida et al. ............. 369/30.36 |
| 2004/0236958 | A1 | | 11/2004 | Teicher et al. |
| 2005/0005131 | A1 | * | 1/2005 | Yoshida et al. ............... 713/183 |
| 2005/0160440 | A1 | * | 7/2005 | Matsuda et al. ............. 720/645 |

(Continued)

OTHER PUBLICATIONS

International Search Report & The Written Opinion of the International Searching Authority dated Oct. 28, 2008, Patent Cooperation Treaty, Application No. PCT/IL07/00004 filed Jan. 2, 2007.

(Continued)

*Primary Examiner* — Syed A. Zia
(74) *Attorney, Agent, or Firm* — Vierra Magen Marcus & DeNiro LLP

(57) ABSTRACT

The present invention teaches a powerless lockable UFD system and a method for securely protecting information stored and retrieved on UFDs (USB flash drives) that does not require electric power in order to enter a password to the UFD. The system also features an alarm and reset mechanism for clearing entered passwords. Passwords are concealed from the sight of a viewer for further protection. The system can be similarly incorporated into peripheral devices such as hard-disk drives (HDDs), printers, scanners, cameras, and portable memory devices.

18 Claims, 1 Drawing Sheet

Password Entry     UFD Body     Host System

U.S. PATENT DOCUMENTS

| | | | |
|---|---|---|---|
| 2005/0193170 A1* | 9/2005 | Endo | 711/115 |
| 2005/0193188 A1* | 9/2005 | Huang | 713/1 |
| 2005/0235341 A1* | 10/2005 | Stieglitz et al. | 726/5 |
| 2006/0036872 A1* | 2/2006 | Yen | 713/183 |
| 2006/0112420 A1* | 5/2006 | Challener et al. | 726/5 |
| 2007/0061894 A1* | 3/2007 | Skinner et al. | 726/28 |
| 2008/0028146 A1* | 1/2008 | Dan et al. | 711/115 |
| 2008/0215841 A1* | 9/2008 | Bolotin et al. | 711/164 |

OTHER PUBLICATIONS

International Preliminary Report dated Mar. 19, 2009, Patent Cooperation Treaty, Application No. PCT/IL07/00004 filed Jan. 2, 2007.
U.S. Appl. No. 11/318,473, filed Dec. 2005, Dan et al.

* cited by examiner

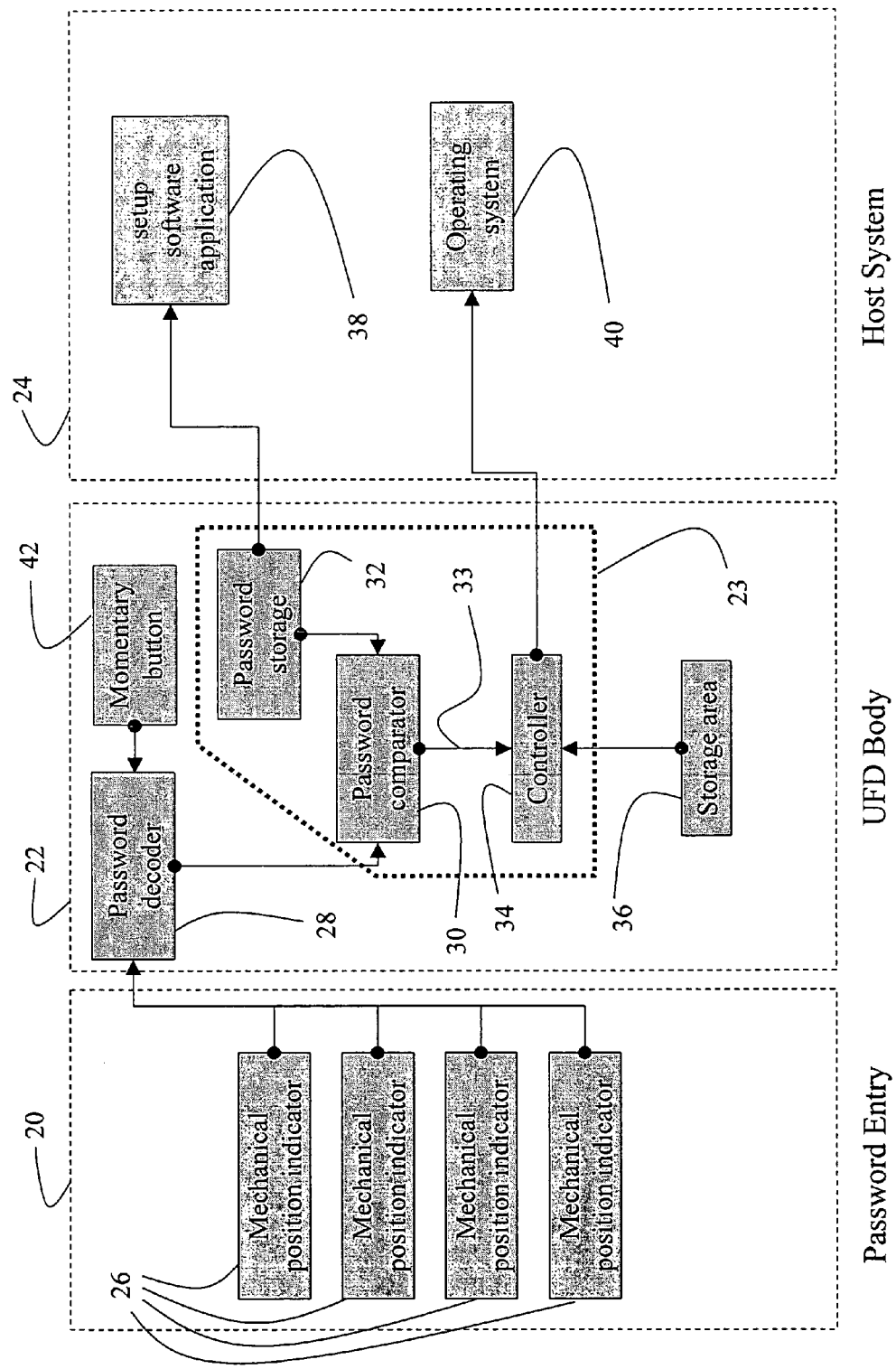

POWERLESS ELECTRONIC STORAGE LOCK

This patent application claims the benefit of U.S. Provisional Patent Application No. 60/755,992 filed Jan. 5, 2006.

FIELD AND BACKGROUND OF THE INVENTION

The present invention relates to a powerless lockable UFD system and a method for securely protecting information stored and retrieved on UFDs (USB flash drives) that does not require electric power in order to enter a password to the UFD.

UFDs are well-known in the art of digital computing as devices for portable storage of digital data. As UFDs become more popular, they are increasingly being used for storage of private and confidential information. The likelihood of small UFDs being lost, stolen, or accidentally exchanged is significant. The two factors cited above create a major information security problem, where confidential information can be accessed by unauthorized users. Solutions that improve the security of information on UFDs are well-known in the art, and include encryption, password protection, and biometric identification methods.

Additional solutions to this security problem have been offered, such as physical locking of the UFD (U.S. patent application Ser. No. 11/318,473). A representative family of solutions to this problem is using a combination lock that is part of the UFD. The UFD is rendered operational only if the right combination is set on the combination lock. This family of solutions has an inherent advantage compared to other types of solutions. They relieve the user from having to deal with security issues after the UFD has been inserted into its host system. Other methods, such as entering a password through the host system or decryption of files on the UFD, require the user to interact with the UFD, through the host system, after it has been inserted into the host system. This is both a burden to the user, and a security hazard as the host system may be programmed to trace and capture the information retrieved from the UFD.

State-of-the-art systems, that allow a user to independently unlock a UFD apart from a host system, are all electromechanical and require a power source, typically a battery. While this is not a major problem, as the power consumption is small relative to the battery capacity, it is a risk, as the user may not tolerate a depleted battery depriving him from his information. Furthermore, including a battery would also increase product cost and complexity.

It would be desirable to have a system for locking and unlocking UFDs in which the lock can be unlocked while the UFD is separated from the host system, and without the need for an electric power source.

SUMMARY OF THE INVENTION

For the purpose of clarity, the term "UFD" is specifically defined for use within the context of this application. The term "UFD" is used in this application to refer to a USB Flash Drive or any other portable storage device. While the "U" in "UFD" stands for USB, it does not imply that the connector must be only a USB connector. Similarly, while the "F" in "UFD" stands for "Flash", it does not limit the storage technology to be flash technology. Finally, the "D" in "UFD" stands for "Drive", but does not limit the storage device to function like a disk drive. The term UFD is used for convenience, since the storage device will indeed be a UFD in most implementations of this invention.

The term "powerless" is used in this application to refer to a device lacking a persistent power source. Thus, the present invention includes embodiments where power is extracted from the user's interaction. The term "verification" is used in this application to refer to the process of determining that a current mechanical state of the password-entry mechanism is identical to a predetermined mechanical state of the password-entry mechanism by the state-identifying mechanism. The term "relatively long" is used in this application to refer to a span of time longer than the longest time it would be expected to be necessary for a user to physically make the insertion operation of a UFD into a host system.

It is the purpose of the present invention to teach a system for protecting a UFD with a password, where the password is interpreted when the UFD is powered by the host system, but is entered by the user prior to the insertion of the UFD to the host system. While the standard definition of a password would include any unique alphanumeric sequence, used as a verified identifier for device access and use, using mechanical buttons in this case, the term "password" is used in this application to primarily include the correct setting of dials, sliders, switches, and/or other mechanical devices.

Moreover, in a preferred embodiment of the present invention, the password is interpreted inside the UFD and is not communicated to the host system, so that it is difficult or impossible to capture the password using the host system.

In a preferred embodiment of the present invention, the password can be altered by the user using a trusted host system.

In another preferred embodiment of the present invention, the password can be introduced through the host system in case the user is not able to enter the password via the mechanism on the UFD due to a mechanical problem.

In another preferred embodiment of the present invention, the password is embedded in a token that can be attached to the UFD, and does not require entering a password.

In another preferred embodiment of the present invention, the UFD is unlocked in response to a successful challenge-response dialogue with the token.

Combinations of the above-mentioned embodiments are also considered embodiments of the present invention.

Therefore, according to the present invention, there is provided for the first time a powerless lockable UFD system, the system including: (a) a password-entry mechanism having a plurality of distinguishable mechanical states configured to be operationally connected to a UFD; (b) a state-identifying mechanism for identifying the plurality of distinguishable mechanical states; and (c) an electrical mechanism for effecting operational connectivity between the UFD and a host system only upon: (i) external powering of the state-identifying mechanism; and (ii) verification that a current mechanical state of the password-entry mechanism is identical to a predetermined mechanical state of the password-entry mechanism by the state-identifying mechanism.

Preferably, the password-entry mechanism includes at least one mechanical knob.

Preferably, the password-entry mechanism includes at least one mechanical button.

Preferably, the state-identifying mechanism is located on the host system.

Preferably, the predetermined mechanical state is configured to automatically change, after a single session of use of the UFD, according to a predetermined sequence.

Preferably, the predetermined mechanical state is concealed from the view of an observer upon being entered into the password-entry mechanism.

Preferably, the system further includes: (d) a state-changing mechanism for changing the predetermined mechanical state.

Preferably, the predetermined mechanical state is a predetermined angular position of at least one wheel.

Most preferably, a rotation of at least one wheel is configured to change an electrical resistance between two wires.

Preferably, at least one wheel is configured such that rotation of at least one wheel changes an encoding of a shaft encoder.

Preferably, the state-identifying mechanism is located on the UFD.

More preferably, the UFD is configured to be powered by the host system.

Most preferably, the state-identifying mechanism is configured to start operating automatically upon powering of the UFD.

Preferably, the system further includes: (d) a resetting mechanism for resetting the electrical mechanism upon a relatively long disconnection of the UFD from the host system, thereby requiring re-establishment of said predetermined mechanical state in order to re-effect said operational connectivity between the UFD and the host system.

Preferably, the system further includes: (d) an alarm mechanism for reminding a user to change the current mechanical state of the password-entry mechanism upon the operational connectivity between the UFD and the host system being established.

Most preferably, the alarm mechanism is configured to periodically alert the user to modify the current mechanical state while the UFD is connected to the host system.

Most preferably, the alarm mechanism is configured to deny operational connectivity between the UFD and the host system until the current mechanical state is changed.

According to the present invention, there is provided for the first time a powerless lockable peripheral-device system, the system including: (a) a password-entry mechanism having a plurality of distinguishable mechanical states configured to be operationally connected to a peripheral device; (b) a state-identifying mechanism for identifying the plurality of distinguishable mechanical states; and (c) an electrical mechanism for effecting operational connectivity between the peripheral device and a host system only upon: (i) external powering of the state-identifying mechanism; and (ii) verification that a current mechanical state of the password-entry mechanism is identical to a predetermined mechanical state of the password-entry mechanism by the state-identifying mechanism.

Preferably, the peripheral device is selected from the group consisting of: a hard-disk drive (HDD), a printer, a scanner, a camera, and a portable memory device.

According to the present invention, there is provided for the first time a method of accessing data stored on a powerless lockable UFD, the method including the steps of: (a) configuring the UFD to compare a mechanical state of at least one password-entry mechanism to a predetermined mechanical state upon external powering of the UFD; (b) setting the mechanical state to a first state; (c) operationally connecting the UFD to a host system subsequent to the step of setting the mechanical state to the first state; (d) comparing the first state to the predetermined state upon powering of the UFD by the host system; and (e) enabling an operational connectivity between the UFD and the host system only upon a match between the first state and the predetermined state.

These and further embodiments will be apparent from the detailed description and examples that follow.

BRIEF DESCRIPTION OF THE DRAWINGS

The invention is herein described, by way of example only, with reference to the accompanying drawing, wherein:

The sole FIGURE shows a simplified block diagram of a system according to some embodiments of the present invention.

DESCRIPTION OF THE PREFERRED EMBODIMENTS

The present invention relates to a powerless lockable UFD system and a method for securely protecting information stored and retrieved on UFDs (USB flash drives) that does not require electric power in order to enter a password to the UFD. The principles and operation of a powerless lockable UFD system, according to the present invention, may be better understood with reference to the drawing and the accompanying description.

Referring now to the drawing, the FIGURE shows a simplified block diagram of a system according to some embodiments of the present invention. A UFD 22, such as a DiskOnKey™ portable memory available from M-Systems Inc. of Kefar Saba, Israel, is connected to a host system 24 such as a personal computer. UFD 22 has a storage area 36 used for storage of data that is transferred between storage area 36 and host system 24 via a controller 34 in UFD 22. Controller 34 is designed to deny access to storage area 36 to host system 24 unless there is an indication from a password comparator 30 that such transaction is permitted.

Password comparator 30 gives permission to controller 34 if password comparator 30 is satisfied that a password received from a password decoder 28 is compatible with a nominal password stored in a password storage 32 within UFD 22. Password comparator 30, password storage 32, and controller 34 are physically located in proximity to each other on a single electronic chip 23. This prevents a hacker from being able to access a password confirmation 33 between comparator 30 and controller 34. Such access would enable a hacker to provide controller 34 with a false indication that the password is correct.

One or more mechanical position indicators 26 are located in a password entry 20 that can be an integral part of UFD 22, or can be a separate part that attaches to UFD 22. Position indicators 26 can be potentiometers, a ladder of resistors, an array of miniature switches, an array of thumbwheel switches, an optical shaft encoder, or any other mechanism by which a stable mechanical setting can be recognized by an electrical mechanism.

When the user plugs UFD 22 into host system 24, UFD 22 is powered by host system 24 through its connector, typically a USB connector. Upon activation, password decoder 28 converts the outputs of position indicators 26 into a digital password. In a preferred embodiment of the present invention, the outputs of position indicators 26 take the form of an analog component value, such as resistance or capacitance, and password decoder 28 converts the analog values into a digital number. In another preferred embodiment of the invention, password decoder 28 triggers active devices in position indicators 26, such as one or more light sources and photoelectric cells, and reads the digital output.

Once password decoder 28 has converted the outputs of position indicators 26 into a digital value, password decoder 28 outputs this digital value (i.e. the password) to password comparator 30. Password comparator 30 compares this password with the nominal password stored in password storage 32. If there is a match between the two passwords, password comparator 30 sends an indication, via password confirmation 33, to controller 34 to enable access to storage area 36.

The user can change the password when UFD 22 is unlocked. In one preferred embodiment of the present invention, this procedure is accomplished by a setup software application 38 on host system 24. Host system 24 is protected by conventional methods of security access control regulated by an operating system 40, such as a password, biometrics, or a token. It is noted that, in another preferred embodiment of the present invention, password decoder 28 and password comparator 30 are located on host system 24.

In another preferred embodiment of the present invention, the password of UFD 22 can be reset by activating a momentary button 42 on UFD 22 as follows. Depressing momentary button 42, while UFD 22 is unlocked, will activate the current settings of position indicators 26 to be a new password. This enables the user to change the password without requiring access to a trusted host system. Preferably, the required depression of momentary button 42 for activation should be long and intermittent in order to avoid an accidental activation, which may change the password to incidental settings of position indicators 26.

Since UFD 22 is inserted into host system 24 with position indicators 26 set to the secret password, there is a risk that a person that has access to UFD 22, when operational, will see the settings of position indicators 26, thereby obtaining the password. This is an undesirable situation which can be avoided by concealing the password in numerous ways. According to preferred embodiments of the present invention, the password can be concealed in the following ways, among others:

(1) A motor (not shown) embedded in UFD 22 can shuffle position indicators 26 once UFD 22 has been unlocked.
(2) The system can keep UFD 22 unlocked for a short period, typically five seconds, after it has been unlocked. This requires keeping the electronics of UFD 22 operational for five seconds, so that it does not reset to the locked position when detached from host system 24. The small amount of electricity necessary to maintain this period can be provided by a charged capacitor (not shown). According to this embodiment, the user sets position indicators 26 to the correct password, plugs UFD 22 into host system 24, verifies that UFD 22 has been unlocked, briefly pulls UFD 22 out of host system 24 to shuffle position indicators 26, and then plugs UFD 22 back into host system 24 for use.
(3) A sentinel software application (not shown) can monitor password confirmation 33, and periodically alert the user to shuffle position indicators 26, while UFD 22 is in use, until the software application verifies that the outputs of position indicators 26 have been changed (through password confirmation 33). Alternatively, the sentinel software application can disable the use of UFD 22 until position indicators 26 have been shuffled.
(4) The nominal password can be automatically changed by setup software application 38 during each activation session, according to a predetermined sequence, so that the user has to use a different password upon each entry. In this embodiment, viewing UFD 22 in operation does not provide useful information to a hacker.
(5) Password entry 20 and position indicators 26 can be configured such that, upon completion of password entry, the password is concealed from the view of an observer by keeping the password setting in a hidden location within UFD 22. An example such a configuration is the mechanism used in common rotating tumbler locks. In these types of locks, the user rotates the dial to set each tumbler in sequence, but the position of the tumblers can't be seen from outside the lock.
(6) A set of buttons can be used as position indicators 26, and can be configured such that, upon completion of password entry, the password is concealed from the view of an observer by keeping the depressed sequence in a hidden location within UFD 22. The depressed buttons would not be visibly different from buttons that were not depressed. A separate button can be configured for clearing the state of all the buttons.

It is noted that among the embodiments included in the present invention, the powerless electronic lock described above can be utilized in devices other than UFDs. A locking device, according to the present invention, can be similarly incorporated into an array of detachable peripheral devices that connect to host systems. Thus, similar security and convenience features can be provided to devices such as: an external hard-disk drive (HDD), a printer, a scanner, a camera, a portable memory device, and other types of peripheral devices.

While the invention has been described with respect to a limited number of embodiments, it will be appreciated that many variations, modifications, and other applications of the invention may be made.

What is claimed is:

1. A powerless lockable peripheral device system, the system comprising:
    a mechanical mechanism having a plurality of distinguishable mechanical states;
    a state-identifying mechanism located on a peripheral device for identifying said plurality of distinguishable mechanical states; and
    an electrical mechanism for effecting operational connectivity between said peripheral device and a host system only upon:
        external powering of said state-identifying mechanism; and
        verification by said state identifying mechanism that a current mechanical state of said mechanical mechanism is identical to a predetermined mechanical state of said mechanical mechanism;
        wherein said electrical mechanism automatically changes said predetermined mechanical state according to a predetermined sequence after a first session of use of said peripheral device to require a different predetermined mechanical state for at least two sessions of use of said peripheral device with said host system;
    wherein said state-identifying mechanism includes a password decoder that converts one or more analog component values corresponding to said current mechanical state into one or more first digital component values corresponding to said current mechanical state; and
    wherein said state-identifying mechanism includes a password comparator that compares said one or more first digital component values corresponding to said current mechanical state to one or more second digital component values corresponding to said predetermined mechanical state and provides said verification to said electrical mechanism when said one or more first digital component values match said one or more second digital component values.

2. The system of claim 1, wherein said mechanical mechanism includes at least one mechanical knob.

3. The system of claim 1, wherein said mechanical mechanism includes at least one mechanical button.

4. The system of claim 1, wherein said electrical mechanism automatically changes said predetermined mechanical state after a single session of use of said peripheral device.

5. The system of claim 1, wherein said predetermined mechanical state is concealed from the view of an observer upon being entered into said mechanical mechanism.

6. The system of claim 1, the system further comprising:
a state-changing mechanism for changing said predetermined mechanical state.

7. The system of claim 1, wherein said predetermined mechanical state is a predetermined angular position of at least one wheel.

8. The system of claim 1, wherein said peripheral device is configured to be powered by said host system.

9. The system of claim 1, the system further comprising:
a resetting mechanism for resetting said electrical mechanism upon a relatively long disconnection of said peripheral device from said host system, thereby requiring re-establishment of said predetermined mechanical state in order to re-effect said operational connectivity between said peripheral device and said host system.

10. The system of claim 1, the system further comprising:
an alarm mechanism for reminding a user to change said current mechanical state of said mechanical mechanism upon said operational connectivity between said peripheral device and said host system being established.

11. The system of claim 8, wherein said state-identifying mechanism is configured to start operating automatically upon powering of said peripheral device.

12. The system of claim 10, wherein said alarm mechanism is configured to periodically alert said user to modify said current mechanical state while said peripheral device is connected to said host system.

13. The system of claim 10, wherein said alarm mechanism is configured to deny operational connectivity between said peripheral device and said host system until said current mechanical state is changed.

14. A method of operating a powerless lockable peripheral device, comprising:
determining a current mechanical state of a mechanical mechanism upon external powering of said peripheral device by a host system;
comparing said current mechanical state to a predetermined mechanical state of said mechanical mechanism after powering of said peripheral device;
enabling operational connectivity between said peripheral device and said host system only if said current mechanical state matches said predetermined mechanical state; and
automatically changing said predetermined mechanical state after enabling operational connectivity between said peripheral device and said host system;
wherein comparing said current mechanical state to a predetermined mechanical state comprises:
converting one or more analog component values corresponding to said current mechanical state into one or more first digital component values corresponding to said current mechanical state,
comparing said one or more first digital component values corresponding to said current mechanical state to one or more second digital component values corresponding to said predetermined mechanical state, and
providing a confirmation to a controller of said peripheral device if said one or more first digital component values match said one or more second digital component values.

15. A method according to claim 14, further comprising:
receiving said current mechanical state using one or more mechanical position indicators prior to powering of said peripheral device.

16. A method according to claim 14, wherein:
enabling operational connectivity is a first enabling of operational connectivity between said peripheral device and said host system; and
automatically changing said predetermined mechanical state requires a different current mechanical state for a second enabling of operational connectivity between said peripheral device and said host system.

17. A powerless lockable peripheral device system, the system comprising:
one or more mechanical position indicators having a plurality of distinguishable mechanical states;
a password system that compares a current mechanical state of said one or more mechanical position indicators to a predetermined mechanical state;
a controller that operationally connects said peripheral device to a host system upon external powering of said peripheral device and confirmation that said current mechanical state matches said predetermined mechanical state; and
an alarm that provides an alert to change said current mechanical state of said one or more mechanical position indicators so as not to match said predetermined mechanical state after said peripheral device is operationally connected to said host system;
wherein said password system includes a password decoder that converts one or more analog component values corresponding to said current mechanical state into one or more first digital component values corresponding to said current mechanical state; and
wherein said password system includes a password comparator that compares said one or more first digital component values corresponding to said current mechanical state to one or more second digital component values corresponding to said predetermined mechanical state and provides said confirmation to said controller when said one or more first digital component values match said one or more second digital component values.

18. A powerless lockable peripheral device system according to claim 17, wherein:
said password system maintains the same predetermined mechanical sate in response to a change to said mechanical position indicators after said alarm provides said alert.

* * * * *